March 26, 1946.　　　C. W. BROWN　　　2,397,239
WRENCH
Filed Sept. 1, 1944

Charles W. Brown
INVENTOR.

BY
ATTORNEYS.

Patented Mar. 26, 1946

2,397,239

UNITED STATES PATENT OFFICE 2,397,239

WRENCH

Charles W. Brown, Falls Church, Va.

Application September 1, 1944, Serial No. 552,317

3 Claims. (Cl. 81—88)

This invention relates to wrenches, one of the objects being to provide a quick adjustable wrench having simple and efficient means whereby, after the jaws of the wrench have been applied to the object to be gripped, they can be given a supplemental movement for the purpose of clamping tightly on the object.

A further object is to provide a wrench which is simple and compact in construction and that can be easily handled, it being possible to so construct the wrench as to adapt it for turning either nuts or round objects.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

In the accompanying drawing the preferred form of the invention has been shown.

Figure 1:
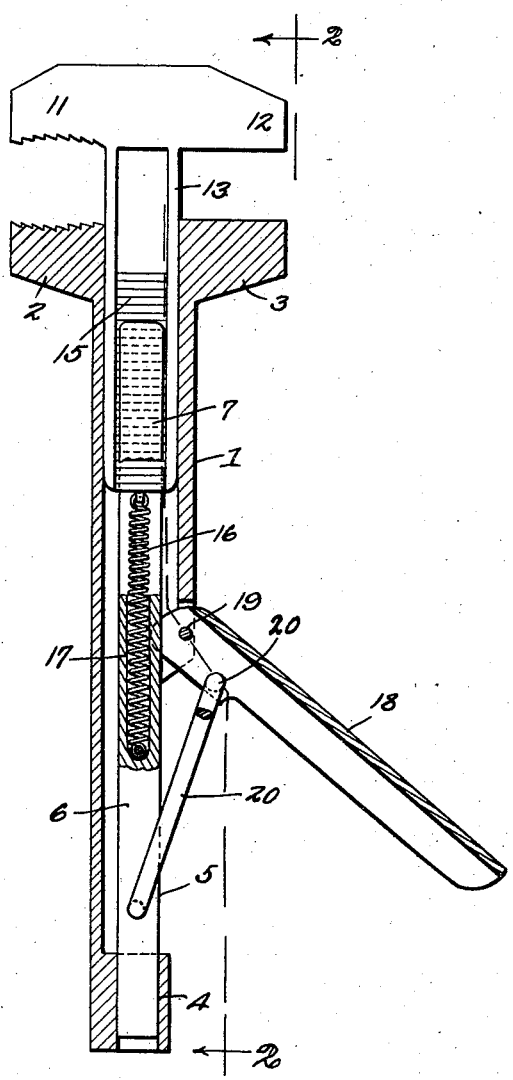
Figure 1 is a central longitudinal section through the wrench, the adjustable jaws and a portion of one of the fork members being shown in elevation.
Figure 2:
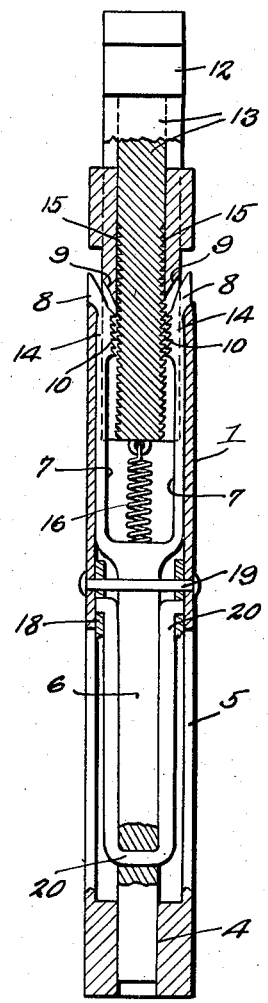
Figure 2 is a section on line 2—2, Figure 1.

Referring to these figures by characters of reference, 1 designates a tubular shank having, in the present structure, oppositely extended fixed jaws 2 and 3. One of these jaws can be used for turning pipes and other round objects while the other can be used for turning nuts. That end of the shank 1 remote from these jaws has a guide opening 4 and a longitudinally extending opening 5 is formed in a portion of the shank adjacent to opening 4 by cutting away the shank, as shown.

An elongated slide 6 is mounted at one end in the opening 4 and is extended longitudinally within the shank 1. The other end of the slide is provided with a fork made up of opposed resilient arms 7 the free ends of which are extended outwardly along diverging lines to provide cams 8 which are positioned to slide within openings 9 in the respective sides of the shank 1. The arms 7 are provided adjacent to the cams 8 with teeth 10 located on the inner sides of the arms. These arms preferably are enlarged where the teeth and the cams are located.

Jaws 11 and 12 corresponding and cooperating with the jaws 2 and 3 are mounted on a slidable shank 13 fitted snugly within the tubular shank 1 and positioned between the opposed toothed heads 14 on the arms 7. Opposed faces of the shank 13 are provided with transverse teeth 15 located where they can be engaged by the teeth 10 when the heads 14 are shifted toward each other away from normal positions. Normally, however, these heads are spaced apart a sufficient distance to permit the toothed shank 13 to slide freely between them.

A spring 16 can be secured at one end to the inner end of shank 13 while its other end portion can be extended into and secured within a bore 17 formed in the slide 6.

A lever 18 is pivotally connected to the shank 1 as indicated at 19 and is joined by a link 20 or the like to the slide 6. This lever is adapted to move towards and away from the opening 5.

Obviously the spring 16 serves to hold the jaws 11 and 12 normally pressed toward the jaws 2 and 3. When it is desired to turn an object by means of the wrench, the movable jaws 11 and 12 are pulled away from the fixed jaws 2 and 3 and the object to be turned is inserted between them. This movement will cause the shank 13 to pull through the spring 16 on the slide 6 which, in turn, will thrust through link 20 against lever 18 and move the lever outwardly about its pivot 19. Thereafter lever 18 is grasped in the hand holding the shank 1 and thrust toward the shank. This will cause a thrust to be transmitted from lever 18 through link 20 to the slide 6 and this slide will be moved longitudinally away from the jaws. This movement of the slide will cause the cams 8 to come against the adjacent walls of the openings 9 and to be deflected toward each other by said walls. Consequently the teeth 10 will be brought into engagement with the teeth 15 and during continued backward movement of the slide 6 the toothed heads 14 engaging shank 13 will pull said shank back into shank 1 for a limited distance so that the article between the jaws will be tightly gripped. As the point of connection between the link 20 and lever 18 will be past a dead center the parts will be held in gripping position until released. As soon as lever 18 is released, the shank 13 will be freed so that it can be pulled outwardly to any desired position relative to the shank 1.

What is claimed is:

1. A wrench including a tubular shank, a movable shank slidable therein, jaws on the respective shanks, a fork slidable in the tubular shank and embracing the movable shank, means operated by a hand gripping the tubular shank, for sliding the fork in one direction, teeth on the movable shank, teeth on the fork adjacent to but normally spaced from the teeth on the shank, and means controlled by said sliding movement of the fork for contracting the fork to engage the teeth thereon with the teeth on the shank for actuation with the fork.

2. A wrench including a tubular shank, a movable shank slidable therein, jaws on the respective shanks, a fork slidable in the tubular shank and embracing the movable shank, means operated by a hand gripping the tubular shank, for sliding the fork in one direction, teeth on the movable shank, teeth on the fork adjacent to but normally spaced from the teeth on the shank, and means controlled by said sliding movement of the fork for contracting the fork to engage the teeth thereon with the teeth on the shank for actuation with the fork, said means including cam portions carried by the free ends of the fork, there being portions of the tubular shank constituting means for deflecting the cam portions toward each other when the fork is shifted in one direction.

3. A wrench including a tubular shank, a toothed shank slidable therein, jaws on the shanks, a slide in tubular shank, a fork on the slide embracing the toothed shank, a resilient connection between the slide and toothed shank, means shiftable by a hand gripping the tubular shank for moving the slide in one direction, and means controlled by said movement of the slide for contracting the fork to grip and pull the toothed shank.

CHARLES W. BROWN.